United States Patent [19]

Foley

[11] 4,181,577

[45] Jan. 1, 1980

[54] REFRIGERATION TYPE WATER DESALINISATION UNITS

[75] Inventor: Norman L. Foley, Modbury North, Australia

[73] Assignee: Auscoteng Pty. Ltd., Rose Park, Australia

[21] Appl. No.: 781,125

[22] Filed: Mar. 25, 1977

Related U.S. Application Data

[63] Continuation-in-part of Ser. No. 597,448, Jul. 21, 1975, abandoned.

[51] Int. Cl.² .......................... B01D 3/06; B01D 3/10
[52] U.S. Cl. .............................. 202/181; 202/185 R; 202/202; 202/205; 203/DIG. 4
[58] Field of Search ............... 202/209, 235, 202, 177, 202/181, 185 R; 203/DIG. 4

[56] References Cited

U.S. PATENT DOCUMENTS

| | | | |
|---|---|---|---|
| 3,102,083 | 8/1963 | Adams | 202/202 |
| 3,248,305 | 4/1966 | Williamson | 203/DIG. 4 |
| 3,291,703 | 12/1966 | Dvonch et al. | 202/185 |
| 3,725,206 | 4/1973 | Foley | 202/177 |
| 3,860,494 | 1/1975 | Hickman | 202/177 |
| 4,055,196 | 10/1977 | Kearny | 202/169 |

*Primary Examiner*—Hiram H. Bernstein
*Attorney, Agent, or Firm*—Wofford, Fails & Zobal

[57] ABSTRACT

A water distillation system in which the heat supplied to the evaporator and the cooling of the condenser is provided by a refrigeration unit having its condensing coils in the evaporator and its evaporative coils in the condenser.

1 Claim, 2 Drawing Figures

REFRIGERATION TYPE WATER DESALINISATION UNITS

This application is a continuation-in-part of application Ser. No. 597,448 filed July 21, 1975 and now abandoned.

This invention relates to improvements in and to water desalinisation units utilising refrigeration purposes.

BACKGROUND OF INVENTION

In the production of water which has its saline content removed various methods have been proposed heretofore, and amongst these is a system where a pressure reduction is used to improve the efficiency of the vaporisation of the water from which the solids such as salts are to be removed.

A typical system of this type is to utilise a steam evaporator section where the water is brought to a condition where evaporization takes place at a relatively high rate, and this vapour or steam is then moved to a heat exchanger where it is condensed to ultimately flow out as purified water.

Such a system of course involves a vacuum pump which can produce the necessary pressure drop in the evaporator, and various problems have been experienced in the past with this type of unit which it is the object of the present invention to over-come, amongst these difficulties being the attainment of relatively low cost of the system because it will be realised that pumping costs are a critical factor and very careful design is necessary to achieve minimum running costs. It is also highly necessary to avoid the formation of scale in such a system because of the difficulty of cleaning the mechanism and it is therefore an object of this invention to ensure that scale formation does not take place.

Problems also exist in the ratio of brine which has to be pumped from the system because obviously the system must be maintained at a working condition and as the salinity or impurities in the water increase in the evaporator, it is necessary to draw off some of this product and to replace it with a supply so that the cycle will continue effectively, and an object of this invention therefore also is to achieve a correct balance between the draw-off or what we term "blow-down" of liquid which will carry away the accumulated salt and other solids to maintain effective desalinisation.

SUMMARY OF THE INVENTION

To achieve the advantages sought, the present invention comprises a feed control which maintains a regulated height of the feed water in an evaporator, this evaporator being connected to a condenser so that a flow of vapour can take place from the evaporator to the condenser, the condenser in turn having means to draw-off the liquified distillate for its intended use.

DESCRIPTION OF THE DRAWINGS

In order to more fully explain the invention reference is now made to the accompanying drawings in which.

DESCRIPTION OF THE PREFERRED EMBODIMENT

Figure 1:
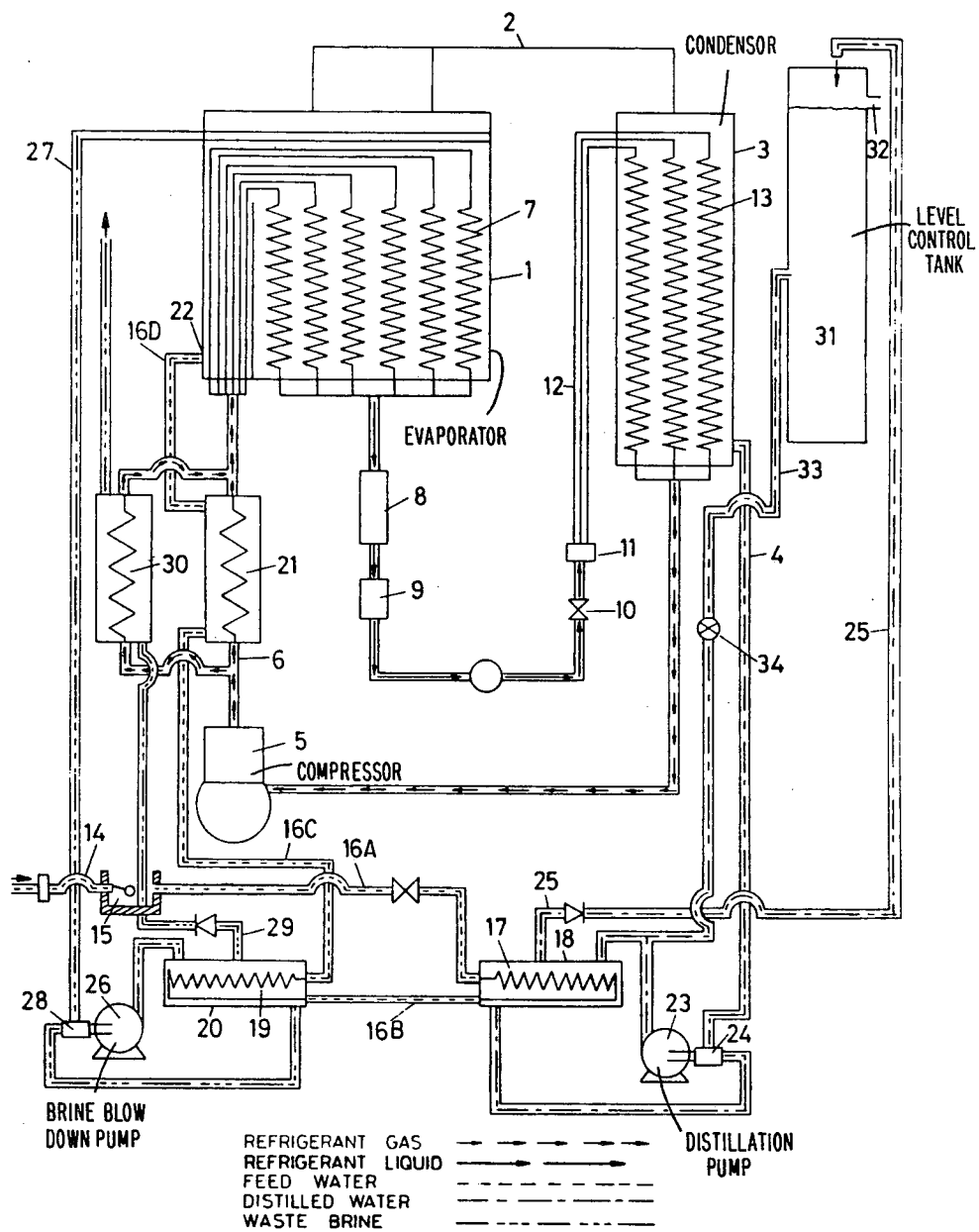
FIG. 1 shows diagrammatically the flow circuit of the invention.

The system includes an evaporator 1 connected by steam lines 2 to a condenser 3, the condensate being taken from the condenser 3 by a product line 4.

The heat is supplied to the evaporator 1 and extracted from the condenser 3 by a refrigeration system, the refrigeration system including a compresser unit 5 passing refrigerant gas through line 6 to a series of coils 7 in the evaporator 1. From the coil 7 the refrigerant now in liquid form passes through a liquid separator 8 and dryer 9 to a pressure reducing valve 10, distributor 11 and parallel lines 12 to the further coils 13 in the condenser 3 from where the refrigerant passes back to the compresser 5.

In this way the refrigeration system takes in heat in the condenser 3 and transfers this heat to the evaporator 1 to cause heating of the liquid in the evaporator.

The raw feed water enters via line 14 to a float controlled feed water tank 15 and then passes through line 16A to a coil 17 in the heat exchanger 18 to be in heat exchange relationship with the product issuing from line 4. Line 16B then passes from coil 17 to coil 19 in in heat exchanger 20 to be heat exchange relationship with the dense water or brine or "blow-down" liquid, and then line 16C passes through a further heat exchanger 21 and then line 16D enters at 22 at a point in the lower portion of the evaporator 1.

The product or distilled water in line 4 is extracted by a distillation pump 23 which extracts the distillate and also draws a high vacuum through the condenser 3 to the evaporator 1, the distillation pump 23 circulating the distillate through the heat exchanger 18 to return to an entrainment chamber 24, and also to cause the distillate to flow through an outlet line 25.

The brine blow down is extracted by a brine blow down pump 26 by extracting the dense brine through line 27 situated towards the top of the evaporator at the desired height to maintain the level of the liquid in the evaporator at this height. The line 27 enters entrainment chamber 28 and the pump 26 feeds the brine through the heat exchanger 20 to be recirculated to the entrainment chamber and the excess passing through line 29 through the feed water tank to be in heat exchange relationship therewith and then through a further heat exchanger 30 to waste.

The product outlet line 25 passes to a level control tank 31 having an overflow 32, the tank 31 being located at or about the same level as the condenser 3, and a return pipe 33 passes from the tank 31 back to the outlet of the pump 23. In this way the tank 31 is full all the time. When the machine is stopped a valve 34 is opened to allow the water to flow into and flood the condenser and surround the coils within it. When the machine is restarted the refrigeration system is operated for a period of time thus extracting the heat from the water in the condenser and transferring this heat into the water in the evaporator. However at this time if the coils in the condenser were not covered with water, the coils would be cooled to a very high degree and any vapour which would be carried over from the condenser would cause icing of the coils. Thus the water is a heat sink and prevents icing of coils until the operating conditions prevail and the steam flows The pump 23 is then operated to pump the water back to the tank 31 and out the outlet 32, the valve 34 being closed and when the water has been extracted from the condenser the pump 23 then draws the required vacuum to cause boiling in the evaporator and the vapour then flows across to be condensed on the condensing coils in the condenser.

Figure 2:
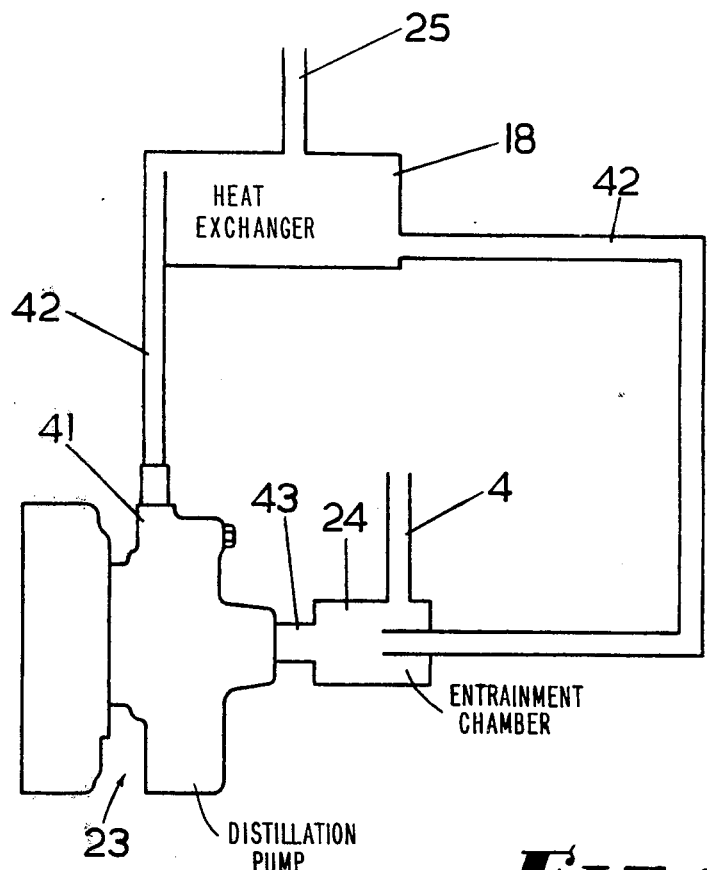
FIG. 2 shows a pump for use in the invention.

Referring to FIG. 2 where a distillation pump 23 is schematically shown, the pump 23 comprises a conventional centrifugal pump 41, the outlet pump 42 of the pump 41 terminating near or opening into the upper portion of the heat exchanger 18 which is thus a liquid trap or separation chamber, the top of the heat exchanger being connected to an outlet line 25. From the bottom of the heat exchanger 18 a recirculation pipe 42 is provided which terminates adjacent to the inlet 43 of the pump 41. Surrounding the end of the recirculating pipe 42 and the end of the inlet pipe 43 is the air or gas entrainment chamber 24 into which enters the product line 4.

The outlet end of the recirculation pipe 42 is disposed spaced from and adjacent to the inlet 43 of the pump with the recirculation pipe 42 being of smaller diameter than the inlet to the pump 43. By suitably positioning the end of the recirculation pipe 42 relative to the inlet 43 to the pump 41, during operation of the pump 41, a greatly reduced pressure is formed in the air entrainment chamber 24 by the jet of water issuing across the space between the two pipes due to the jet of water entraining with it any air or gas in the chamber. The air thus entrained is discharged by the pump 41 into the heat exchanger 18 from whence it issues through the output pipe 25, together with the distillate product.

As a large volume of liquid is being recirculated compared with the volume of air being entrained, the recirculated liquid acts as a liquid seal in the centrifugal pump and is thus able to produce a high vacuum in the entrainment chamber.

Thus the action of the air entrainment chamber 24 is to create a greatly reduced pressure in the air entrainment chamber and hence in the product line 4 which terminates in the air entrainment chamber.

The pump thus produces a high vacuum in the air entrainment chamber but also is able to pump liquid at the same time. Thus when any liquid passes through the air or gas inlet pipe to the entrainment chamber this liquid collects in the bottom of the chamber and when the level rises to the level of the inlet pipe to the pump the liquid is also entrained into the pump, discharged into the heat exchanger 18 which also acts as a liquid trap, the excess of liquid in the heat exchanger 18 being discharged from the top of the liquid trap through the outlet pipe of the trap.

It has been found that in one embodiment satisfactory operation is obtained with the outlet of the recirculation pipe being one half inch in diameter and spaced one inch from the inlet of the pump, the inlet of the pump being one inch in diameter. These figures are not to be taken as limiting but the sizes and spacing may be varied depending on the size of pump, flow of water, etc., to ensure that the desired reduced pressure is obtained.

The brine blow down pump 26 is similar, having its own entrainment chamber 28 and heat exchanger 20 forming the liquid trap for that pump 26.

The system outlined will now be theoretically discussed in relation to the objects which have been set up earlier in this specification.

It will be realised that when all steam produced in an evaporator of a desalinisation system has to be handled by the entrainment chamber, then the entrainment pumping system has to be large enough to carry out this duty. A very large condenser normally produces a relatively small stream of condensate. Hence a small pump will handle this condensate stream but a large system would be required to handle the steam volume, for instance 30 gallons per day condensate = 120,000 cubic feet of steam.

In small desalinators (0–1000 gallons per day) pumping costs are critical but always it is necessary to consider the capital cost of a large condenser against the increased running cost of an entrainment pump system where the product, if not condensed will be immediately condensed in the entrainment chamber of the pump.

The attainment of minimum running cost is a critical factor in water desalinisation and according to this invention steam is condensed in a highly efficient condenser due to both hot and cold fluids passing through a change of state (gas to liquid for water and liquid to gas for refrigerant), this transfer involving large quantities of heat at constant temperatures. Turbulent flows can be assured by design minimising temperature drops through the stagnant layers.

It has been found that it is essential, for maintenance free operation, that no scale is allowed to form on the heat transfer surfaces. This is achieved by ensuring that the hottest surface in contact with the evaporating raw water is below 120° F.

Obviously saturation temperatures of the refrigerant can by design be kept below 120° F. but the super heat due to compression must be controlled. This super heat is removed by placing the gas in heat exchange relationship with the ingoing feed water through heat exchanger 21 wherein no evaporation takes place and the dwell time is short.

Excess in the system is discharged via the blow-down de-super heater 30.

All refrigerant coils are preferably fed from the top to ensure draining of liquid refrigerant from the water evaporator coils (refrigerant condenser) and steam condenser (refrigerant evaporator).

When initiating the heat pump cycle load must be available in the form of heat to allow refrigerant pressures to build and settle at desire heat pump capacities. e.g. If pressures are low, saturation temperatures are well below the freezing temperature of water. This must be guarded against because if this condition persists then the condenser will ice up and all operations cease.

This problem is prevented by the aforesaid tank which ensures that the steam condensing space has sufficient water, that is the condenser is charged with water. The evaporator is of course always charged with water and ready to pass over steam and this steam could condense to ice particularly at the top of the condenser coils if there were not water available as a heat load. When the heat pump compressor starts and runs for say five minutes, the heat available in the water in the condensing space is transferred into the water in the evaporator. This cools the charge water in the condenser and heats the evaporator water. At this point, temperatures and hence gas pressures are such that good operating conditions are achieved and the pumps are started to create the vacuum.

The water charge in the condensing space is emptied into a storage tank for distilled water, the vacuum generated by the pumping system causes steam to be generated in the evaporators, the steam load is applied as heat to the refrigerant in the steam condenser.

To obviate particles of raw water being carried by the steam velocity from the evaporator to the condenser, an automatic lowering of the boiling water level occurs with this system, dependent on the rate of boiling, thus making the use of separators steam baffles and monel mesh unnecessary.

This is achieved because the water is discharged into the evaporator from a raw water feed control such as a float valve, which maintains the supply in the evaporator but obviously if the rate of evaporation increases, then due to the boiling which takes place particularly in the upper levels of the water in the evaporator the actual body of water lowers somewhat in the evaporator due to the boiling throwing more of the upper water down to the blow-down system. The inlet to the evaporator is well down from the top of the evaporator to maintain the less turbulent water in the lower part of the evaporator.

Summing up again the features of the invention it is to be noted that the refrigerant from the compressor passes through heat exchangers one being the feed water heat exchanger which flows into the evaporator the other being a heat exchanger through which the blow-down liquid, that is the liquid which is bled away because of the heavy contamination, flows, the feed water however having also being taken through a heat exchanger associated with the distillate flowing from the condenser and with a heat exchanger associated with the pump of the brine blow-down system, so that considerable heating of the feed water takes place by heat exchange through these various systems.

The gas from the compressors then passes downwardly through a series of pipes or coils in the evaporator to further heat the water in the evaporator and the liquified gas then passes through a receiver and drier to the condenser where again a series of coils are arranged to have a downward flow so that evaporation of the liquid refrigerant takes place in these coils with consequent cooling and condensation of the distillate as it flows through the condenser.

A high degree of vacuum is available from the two entrainment pumps, these pumps being the subject of copending applications to which reference may be had for their full understanding, but briefly the pumps recirculate the liquid, with the liquid passing across an entrainment chamber at the inlet to the pump, the chamber being connected to a passage in which the vacuum is produced.

As stated earlier, some of the distillate is pumped to a tank associated with the condenser and at the commencement of each cycle, there is in the condenser surrounding the refrigeration coils a quantity of water sufficient to ensure that the condenser is not taken to the icing stage till steam formation obviates the problem.

I claim:

1. Apparatus for effecting desalinisation of saline water comprising:
   an evaporator,
   supply means for supplying saline feed water to said evaporator,
   a condenser disposed in fluid flow communication with the evaporator for flow of vapour from the upper portion of the evaporator to the upper portion of the condenser,
   means to supply heat to the evaporator and extract heat from the condenser,
   said means comprising a refrigerant system having its condensing coils in the water evaporator, and its evaporative coils in the water condenser,
   a distillation extraction pump circulating distillate in a closed system to the inlet of the pump through an entrainment chamber into which chamber the distillate from the lower portion of the condenser is drawn, this entrainment of the distillate also producing a vacuum through the condenser into the evaporator to cause flow of vapour from the evaporator to the condenser,
   said distillation extraction pump being connected to a supply of distillate at a higher level than said condenser coils,
   said connection including a valve whereby the condenser coils in said condenser can be selectively flooded during startup to provide a heat sink to prevent icing of the condenser coils,
   a brine extraction pump circulating extracted brine in a closed system to the inlet of the brine extraction pump through an entrainment chamber into which the brine extracted is drawn, this entrainment of the brine being taken from an upper level of the evaporator to maintain the level of the water in the evaporator and assist in maintaining the vacuum therein,
   said pumps maintaining a high degree of vacuum to cause boiling of the water at temperatures slightly above ambient temperature.

* * * * *